(12) United States Patent
Yamauchi et al.

(10) Patent No.: US 11,485,421 B2
(45) Date of Patent: Nov. 1, 2022

(54) VEHICLE FRONT STRUCTURE

(71) Applicant: MAZDA MOTOR CORPORATION, Hiroshima (JP)

(72) Inventors: Kazuki Yamauchi, Aki-gun (JP); Satoshi Kusumoto, Aki-gun (JP); Atsushi Nakamura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 112 days.

(21) Appl. No.: 17/161,521

(22) Filed: Jan. 28, 2021

(65) Prior Publication Data
US 2021/0253177 A1   Aug. 19, 2021

(30) Foreign Application Priority Data
Feb. 13, 2020   (JP) .............................. JP2020-022205

(51) Int. Cl.
| | |
|---|---|
| *B60J 7/00* | (2006.01) |
| *B62D 25/08* | (2006.01) |
| *B62D 25/14* | (2006.01) |
| *B62D 25/10* | (2006.01) |
| *B60K 1/04* | (2019.01) |

(52) U.S. Cl.
CPC ................ *B62D 25/08* (2013.01); *B60K 1/04* (2013.01); *B62D 25/081* (2013.01); *B62D 25/085* (2013.01); *B62D 25/10* (2013.01); *B62D 25/14* (2013.01); *B60K 2001/0411* (2013.01)

(58) Field of Classification Search
CPC ..... H04W 24/10; H04W 72/04; H04W 36/08; H04W 72/042; A61P 35/00; B60R 9/045; B60R 9/12; B60P 3/08; G07B 15/063; B65G 69/003
See application file for complete search history.

(56) References Cited

U.S. PATENT DOCUMENTS

2021/0253177 A1* 8/2021 Yamauchi ............ B62D 25/085
2021/0300479 A1* 9/2021 Onaka .................... B62D 25/12
2021/0309302 A1* 10/2021 Hirai .................... B62D 25/082

FOREIGN PATENT DOCUMENTS

JP              2005067373 A        3/2005

* cited by examiner

*Primary Examiner* — Kiran B Patel
(74) *Attorney, Agent, or Firm* — Studebaker & Brackett PC

(57) ABSTRACT

A vehicle front structure includes a dash upper panel and a grille top face portion having outside air introduction holes taking in outside air. The vehicle front structure includes a cover member covering an engine from a vehicle upper side and having a top plate rear portion opposed to the grille top face portion on a vehicle lower side throughout a predetermined range, including the outside air introduction holes, in a vehicle width direction, and a grille front face portion disposed from the grille top face portion to the top plate rear portion on a vehicle front side of the outside air introduction holes. The top plate rear portion has a shape having inclined surfaces extending from a vehicle lower side of the outside air introduction holes in the vehicle width direction, the inclined surfaces being gradually inclined to the vehicle lower side toward vehicle-width-direction outer sides.

17 Claims, 10 Drawing Sheets

Fig. 4

VEHICLE FRONT STRUCTURE

BACKGROUND

Technical Field

This disclosure relates to a vehicle front structure that includes a water draining path draining water, the water flowing in through an outside air introduction hole, on a vehicle lower side of a cowl grille having the outside air introduction hole introducing outside air, for example.

Background Art

A vehicle such as an automobile is provided with a cowl grille as an external appearance member covering a portion between a windshield and a bonnet, the cowl grille extending in a vehicle width direction along a lower end of the windshield. In this cowl grille, an outside air introduction hole for introducing outside air into an air-conditioning device is often formed to open.

Incidentally, there is a problem that water such as rainwater flows into this outside air introduction hole of the cowl grille together with outside air. Accordingly, in Japanese Patent Laid-Open No. 2005-67373, a cowl box having a closed cross-section extending in the vehicle width direction is provided at an upper end of a dash panel, and a portion of an upper surface of the cowl box is composed of a cowl grille (cowl top garnish).

Accordingly, in Japanese Patent Laid-Open No. 2005-67373, the water flowing in via the outside air introduction hole of the cowl grille (a grille portion of the cowl top garnish) is received by a bottom surface of the cowl box, is caused to flow and move toward a vehicle-width-direction outer side, and is thereby enabled to be drained to a preferable part in an engine room. In other words, the cowl box of Japanese Patent Laid-Open No. 2005-67373 is configured to function as a water draining path draining water such as rainwater.

However, in a vehicle in which a cowl box having the above-described function is not provided on a vehicle lower side of the outside air introduction hole, an engine in an engine room or a vehicle component may be wet by water such as rainwater flowing in through the outside air introduction hole. Thus, it is anticipated that an unintended problem will occur to such a vehicle due to water such as rainwater.

SUMMARY

The present disclosure has been made in consideration of the above-described problem, and provides a vehicle front structure that can prevent wetting of an engine in an engine room or a vehicle component even in a vehicle in which a cowl box is not provided on a vehicle lower side of an outside air introduction hole.

This disclosure provides a vehicle front structure including a dash upper panel extending in a vehicle width direction in an upper portion of a dash panel; and a lateral wall extending in the vehicle width direction on a vehicle upper side of the dash upper panel and having an outside air introduction hole taking in outside air, characterized in that the vehicle front structure includes: a cover member covering at least an engine from a vehicle upper side and having an opposed portion opposed to the lateral wall on a vehicle lower side throughout a predetermined range in the vehicle width direction, the predetermined range including the outside air introduction hole; and a vertical wall extending in the vehicle width direction on a vehicle front side of the outside air introduction hole and disposed from the lateral wall to the opposed portion of the cover member, and the opposed portion of the cover member is formed into a shape having an inclined surface extending from a vehicle lower side of the outside air introduction hole in the vehicle width direction, the inclined surface being gradually inclined to the vehicle lower side toward a vehicle-width-direction outer side.

In this disclosure, water such as rainwater entering through the outside air introduction hole can be received by the opposed portion of the cover member. Furthermore, because the opposed portion of the cover member is formed into the shape having the inclined surface, the vehicle front structure can cause water such as rainwater to flow and move to the vehicle-width-direction outer side along the inclined surface of the opposed portion.

In this case, because the vertical wall is provided on the vehicle front side of the outside air introduction hole, the vehicle front structure can inhibit water such as rainwater from flowing and moving to the vehicle front side. In other words, in the vehicle front structure, a water draining path is composed of the vertical wall and the opposed portion of the cover member, the water draining path extending in the vehicle width direction on the vehicle lower side of the outside air introduction hole and draining water such as rainwater to a vehicle-width-direction outer side of an engine room.

Accordingly, the vehicle front structure can prevent wetting of the engine in the engine room or a vehicle component even in a vehicle in which a cowl box is not provided on the vehicle lower side of the outside air introduction hole.

As an aspect of this disclosure, the cover member may include: a cover top plate portion having the opposed portion and covering the engine from the vehicle upper side; left and right cover side faces covering the engine from vehicle-width-direction outer sides; and a cover rear face covering the engine from a vehicle rear side, the lateral wall and the vertical wall may respectively be composed of a grille top face portion and a grille front face portion, the grille top face portion being a top face of a cowl grille mounted on the dash upper panel, the grille front face portion being a front face of the cowl grille, and a sealing member may be provided between the grille front face portion and the cover top plate portion.

In this configuration, the vehicle front structure can cover the engine by the cover member composed of the cover top plate portion, the left and right cover side faces, and the cover rear face and can thus efficiently perform shielding against radiant heat of the engine.

Furthermore, the vehicle front structure can inhibit hot air in the engine room from entering through a gap between the grille front face portion and the cover top plate portion by the sealing member. Thus, the vehicle front structure can prevent hot air in the engine room from being introduced into an air-conditioning device together with outside air introduced through the outside air introduction hole, for example.

In addition, the sealing member is provided between the grille front face portion and the cover top plate portion, and the vehicle front structure can thereby inhibit water entering through the outside air introduction hole from leaking through the gap between the grille front face portion and the cover top plate portion by the sealing member. Accordingly, the vehicle front structure can reduce a thermal influence on the outside air introduced through the outside air introduction hole and may further prevent wetting of the engine in the engine room or the vehicle component.

Further, as an aspect of this disclosure, the cover top plate portion may be composed of a top plate rear portion that is the opposed portion and a top plate front portion that is disposed on a vehicle front side with respect to the top plate rear portion and pivotably supported by the top plate rear portion via a hinge, and the grille front face portion may be disposed on a vehicle rear side of a rotation center of the top plate front portion.

In this configuration, the vehicle front structure can certainly prevent wetting of the engine in the engine room or the vehicle component. Specifically, in a case where the grille front face portion is provided on the vehicle front side of the rotation center of the top plate front portion, because the grille front face portion overlaps with the hinge of the top plate front portion, a notch enabling the hinge to rotate has to be provided to the grille front face portion. In this case, it is anticipated that water such as rainwater will leak to the vehicle front side through the notch in the grille front face portion.

However, because the grille front face portion is provided on the vehicle rear side of the rotation center of the top plate front portion, a notch does not have to be provided in the grille front face portion in the vehicle front structure. Thus, the vehicle front structure can inhibit water such as rainwater from flowing and moving to the vehicle front side without hindering rotation of the top plate front portion. Accordingly, the vehicle front structure can certainly prevent wetting of the engine in the engine room or the vehicle component.

Further, as an aspect of this disclosure, the opposed portion of the cover top plate portion may include a front rib that is adjacent to the grille front face portion on the vehicle rear side, is provided in a protruding manner to the vehicle upper side, and extends in the vehicle width direction. In this configuration, the vehicle front structure can inhibit water flowing in through the outside air introduction hole from reaching a portion between the grille front face portion and the cover top plate portion. Thus, the vehicle front structure can more certainly prevent wetting of the engine in the engine room or the vehicle component.

Further, as an aspect of this disclosure, the vehicle front structure may include a vehicle component that is disposed on the vehicle lower side of the outside air introduction hole and fixed to the opposed portion of the cover top plate portion, and the opposed portion of the cover top plate portion may include a rear rib that is adjacent to a fixing part of the vehicle component on the vehicle rear side and provided in a protruding manner to the vehicle upper side.

In this configuration, the vehicle front structure can prevent water flowing in through the outside air introduction hole from entering the fixing part of the vehicle component along the cover top plate portion. Thus, the vehicle front structure can prevent leakage of water from the fixing part of the vehicle component.

Accordingly, even in a case where the vehicle component is fixed to the opposed portion of the cover top plate portion, the vehicle front structure can further certainly prevent wetting of the engine in the engine room or the vehicle component.

Further, as an aspect of this disclosure, the vehicle front structure may include a battery disposed adjacently to the opposed portion of the cover top plate portion on the vehicle-width-direction outer side, and the cover top plate portion may be formed such that a lower end of the inclined surface in the opposed portion is positioned on the vehicle lower side of an upper end of the battery.

In this configuration, the vehicle front structure can prevent water flowing and moving along the inclined surface of the cover top plate portion from contacting with an upper surface of the battery. Thus, the vehicle front structure can prevent occurrence of an unintended problem due to wetting of the battery.

The present disclosure can provide a vehicle front structure that can prevent wetting of an engine in an engine room or a vehicle component even in a vehicle in which a cowl box is not provided on a vehicle lower side of an outside air introduction hole.

BRIEF DESCRIPTION OF THE DRAWINGS

FIG. 4 is a front view illustrating the external appearance of the vehicle front portion as viewed from a front;

DETAILED DESCRIPTION

One embodiment of this disclosure will hereinafter be described with reference to drawings.

A vehicle of this embodiment is a vehicle that includes a water draining path draining water, the water flowing in through an outside air introduction hole, on a vehicle lower side of a cowl grille having the outside air introduction hole introducing outside air, for example. A structure of a vehicle front portion 1 in such a vehicle will be described by using FIG. 1 to FIG. 10.

Figure 1:
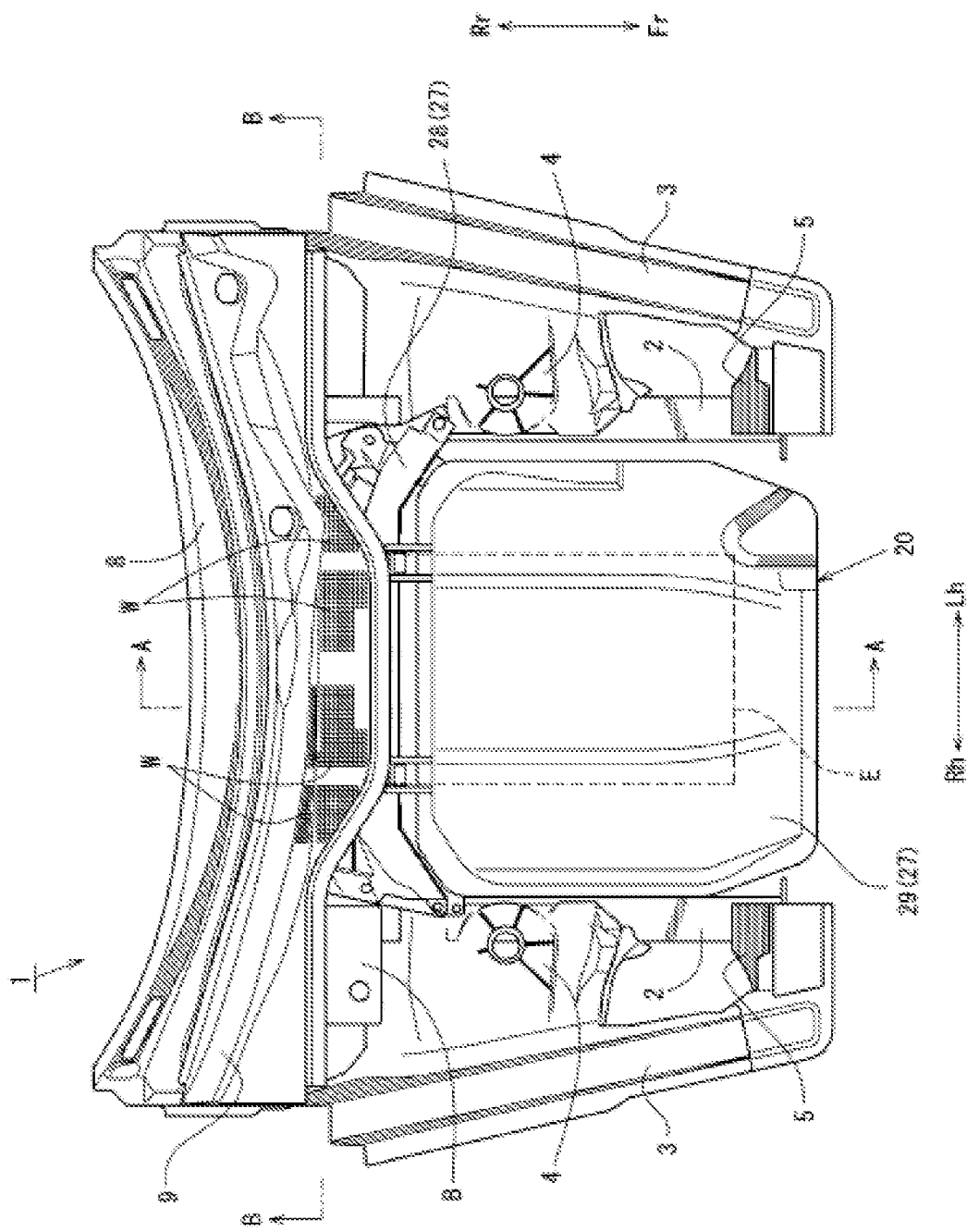
FIG. 1 is a plan view illustrating an external appearance of a vehicle front portion in a planar view.
Figure 2:
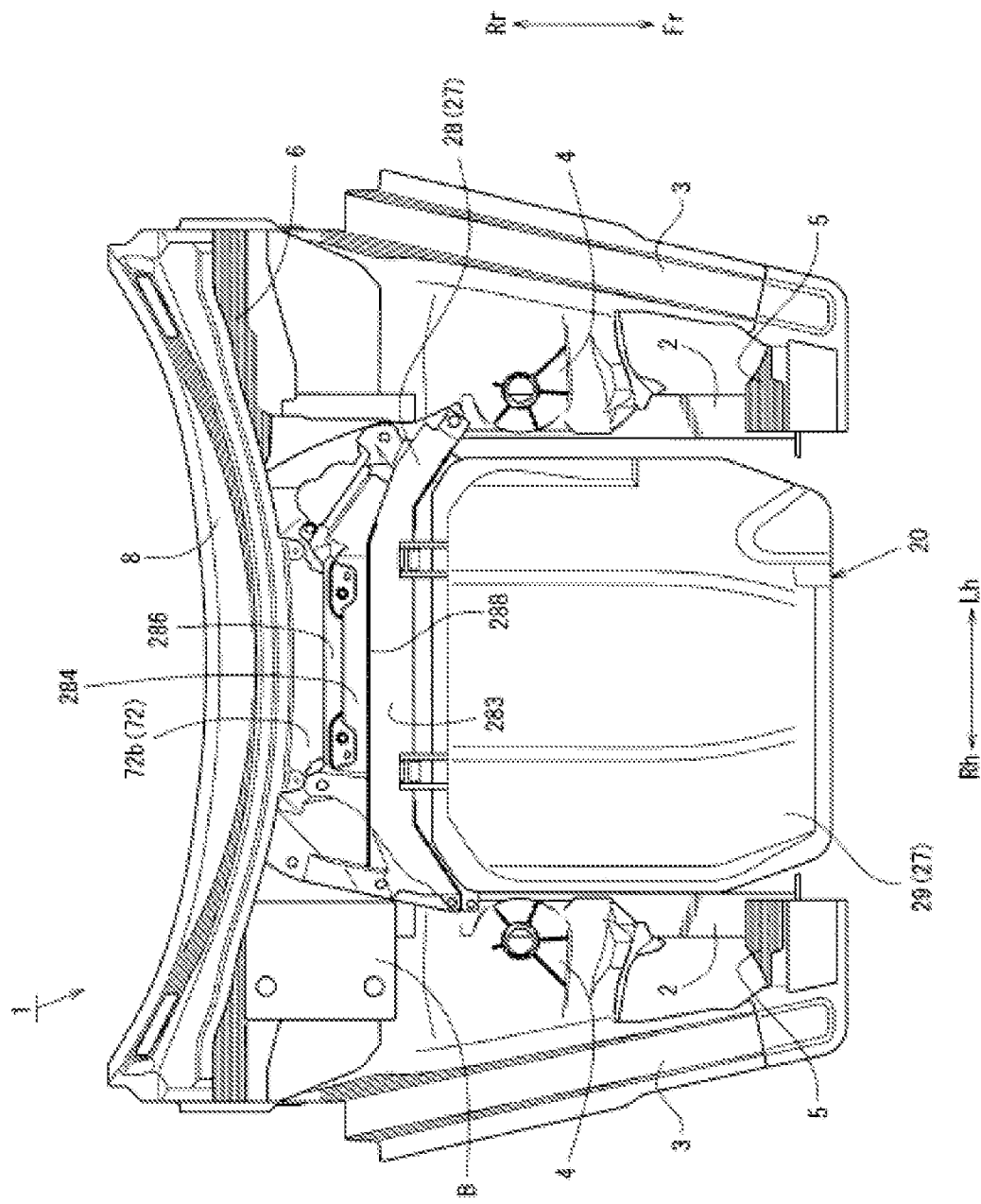
FIG. 2 is a plan view illustrating an external appearance of the vehicle front portion in a state where a cowl grille is detached.
Figure 3:
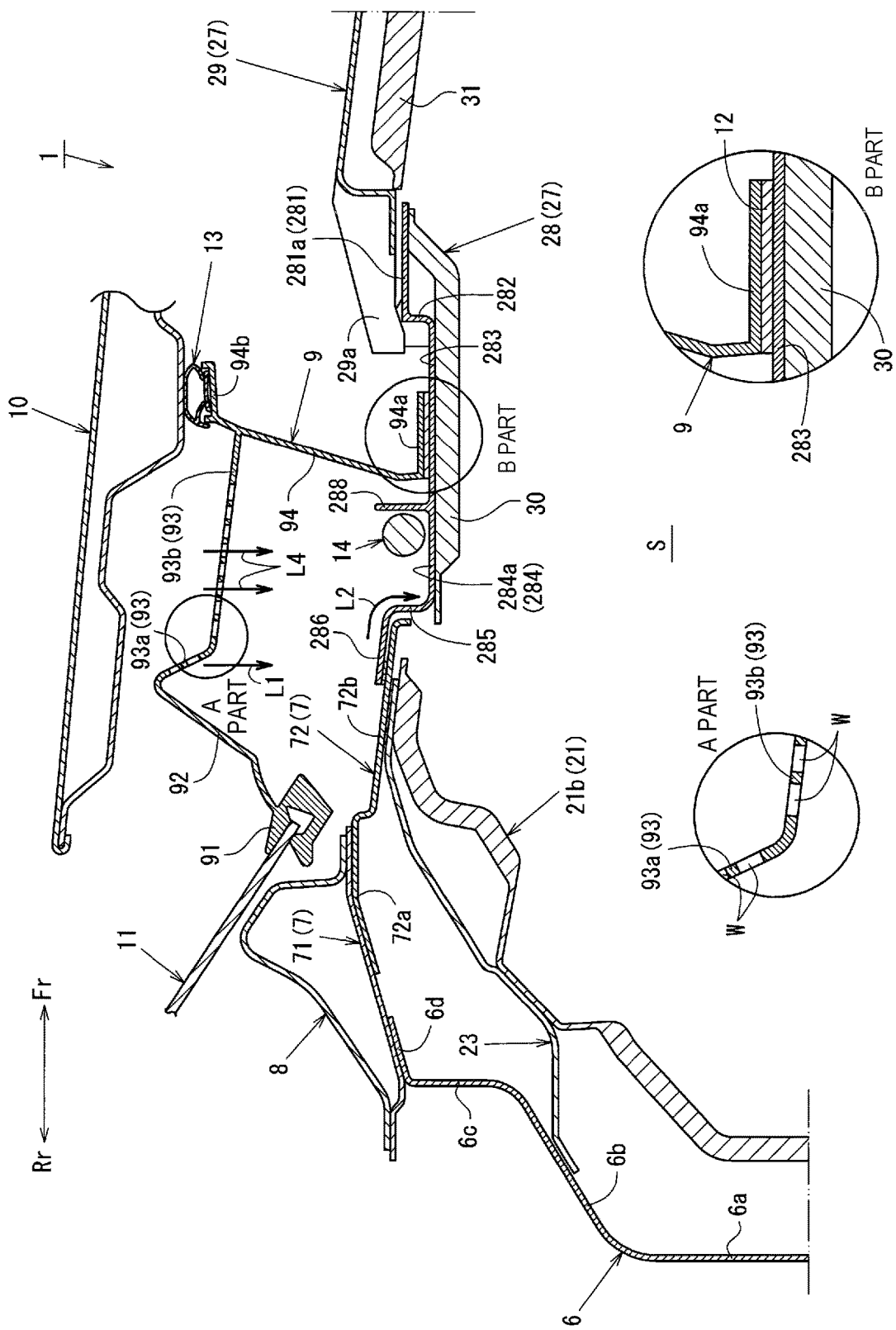
FIG. 3 is an arrow cross-sectional view taken along A-A in FIG. 1.
Figure 4:
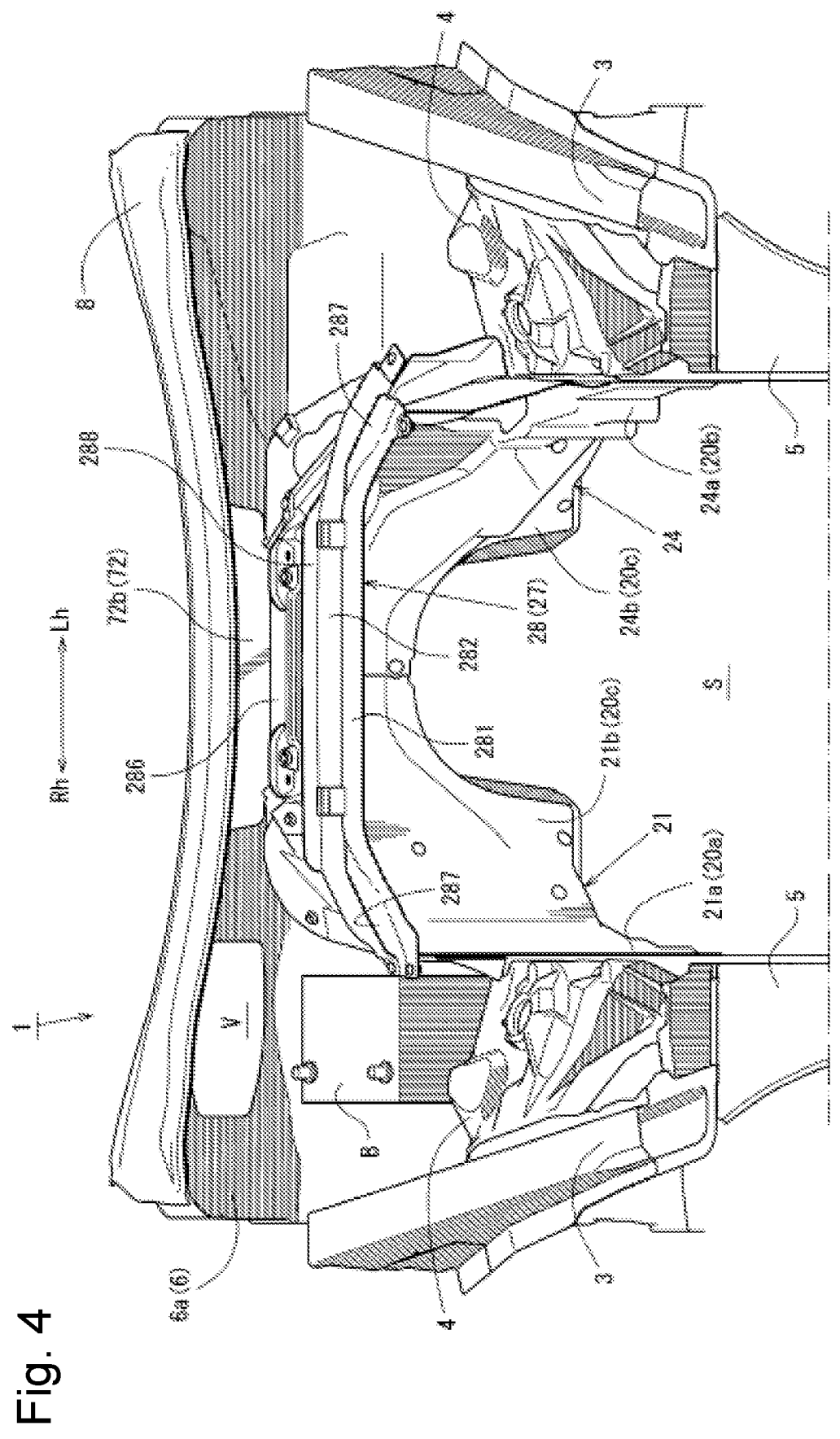

Note that FIG. 1 illustrates a plan view of an external appearance of the vehicle front portion 1, FIG. 2 illustrates a plane view of an external appearance of the vehicle front portion 1 in a state where a cowl grille 9 is detached, FIG. 3 illustrates an arrow cross-sectional view taken along A-A in FIG. 1, and FIG. 4 illustrates a front view illustrating the external appearance of the vehicle front portion 1.

Figure 5:
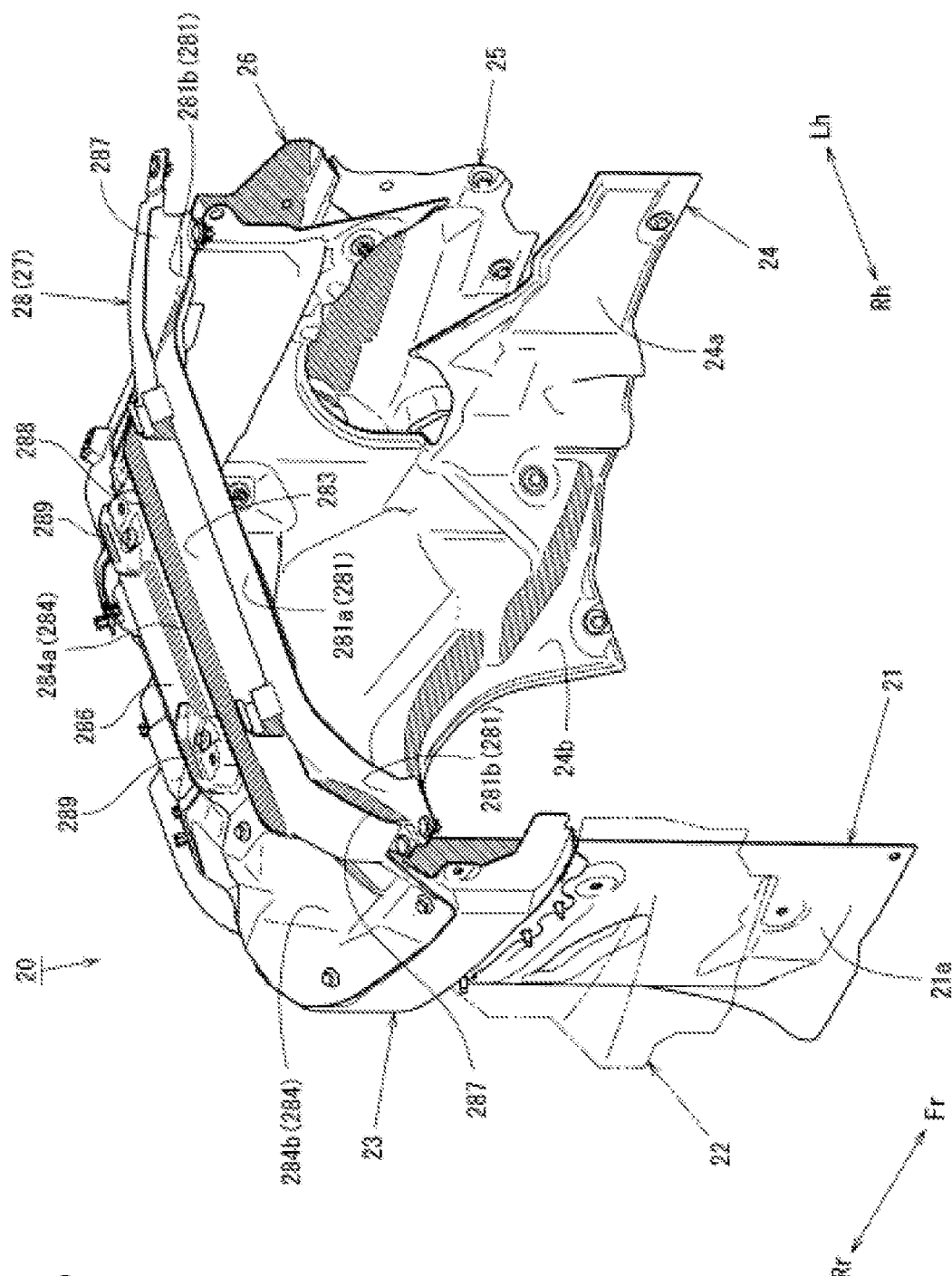
FIG. 5 is an external perspective view illustrating an external appearance of a cover member as seen from a vehicle front side.
Figure 6:
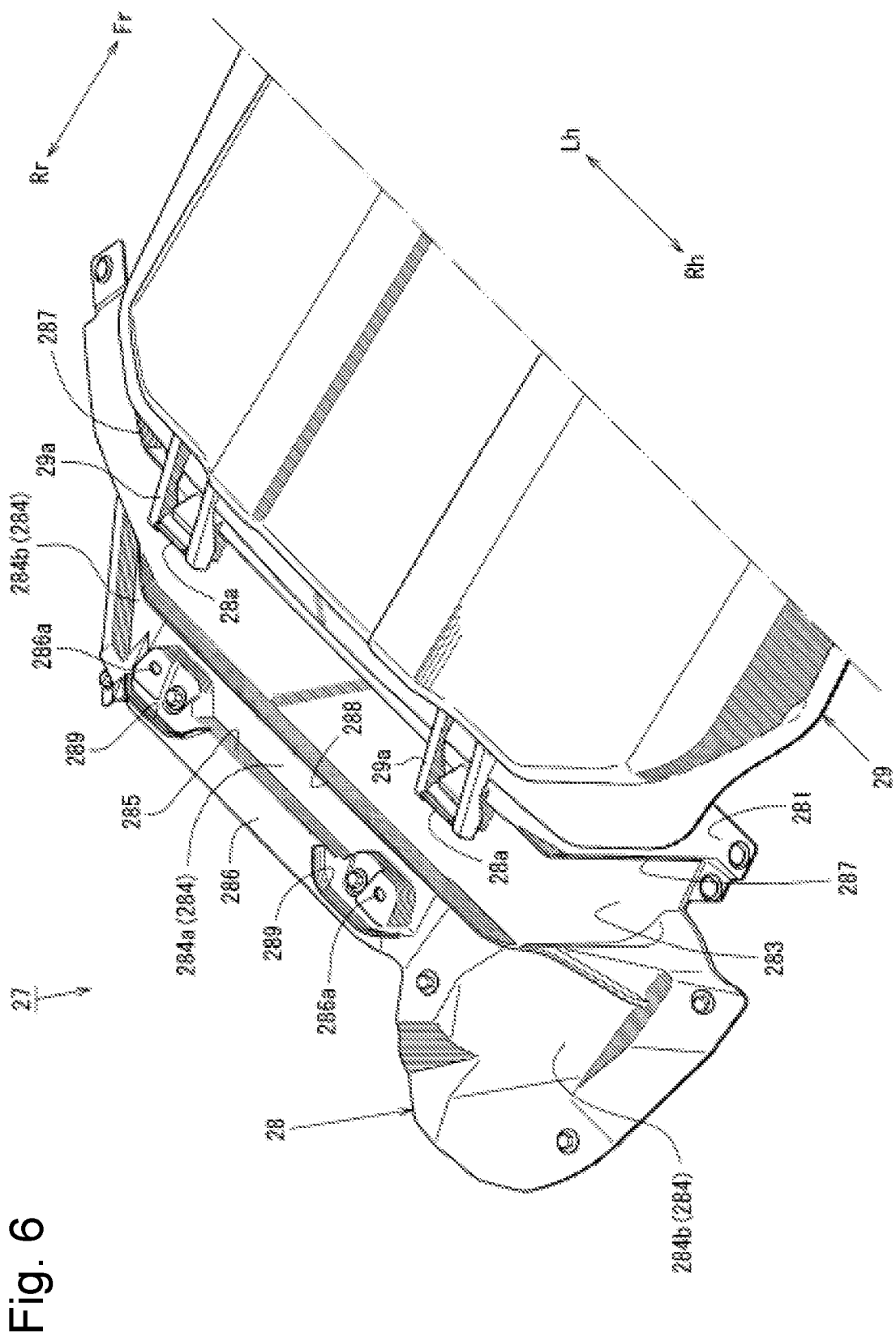
FIG. 6 is a principal-portion external perspective view illustrating an external appearance of principal portions of a cover top plate portion.
Figure 7:
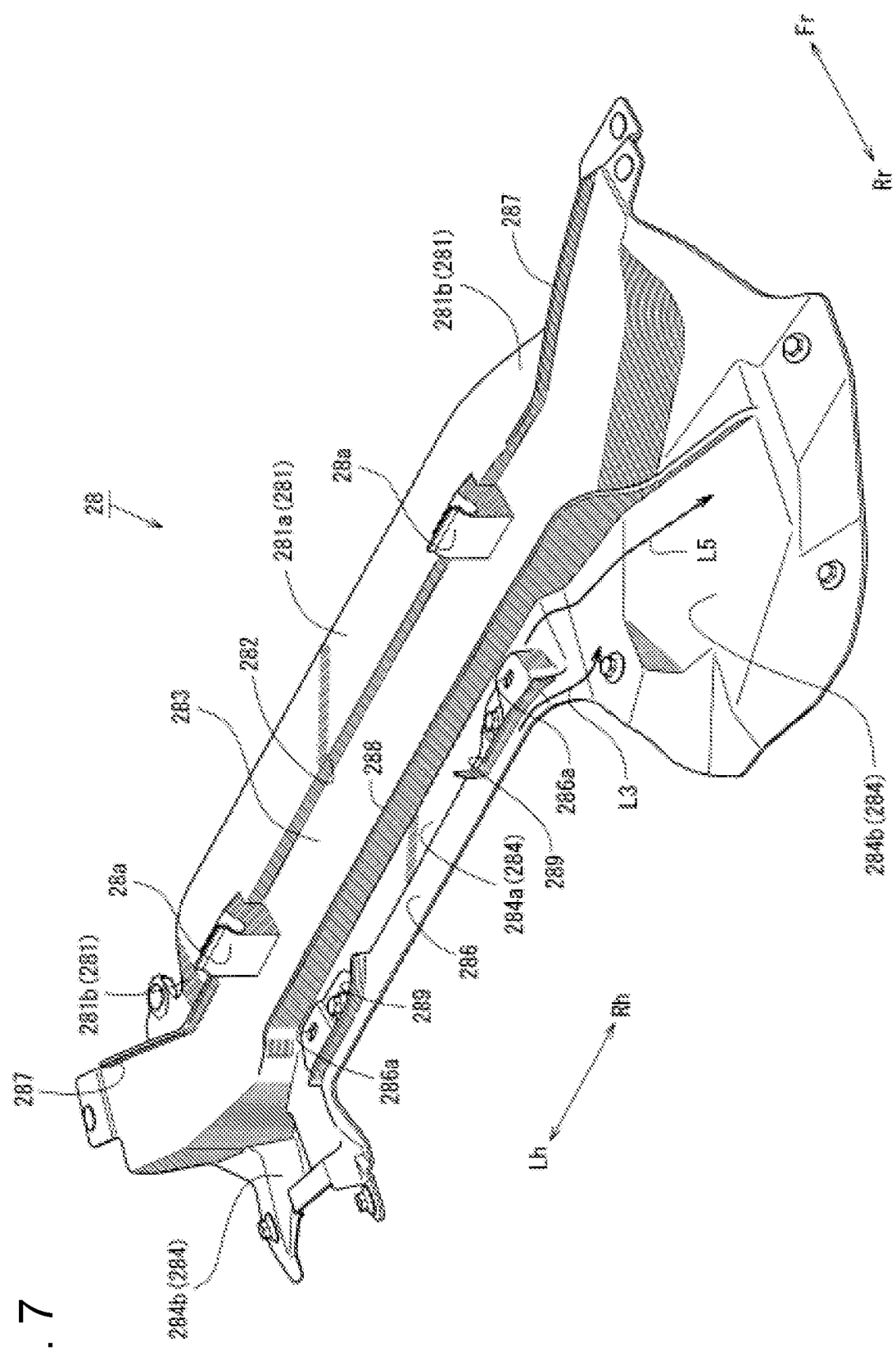
FIG. 7 is an external perspective view illustrating an external appearance of a top plate rear portion as viewed from a vehicle rear upper side.
Figure 8:
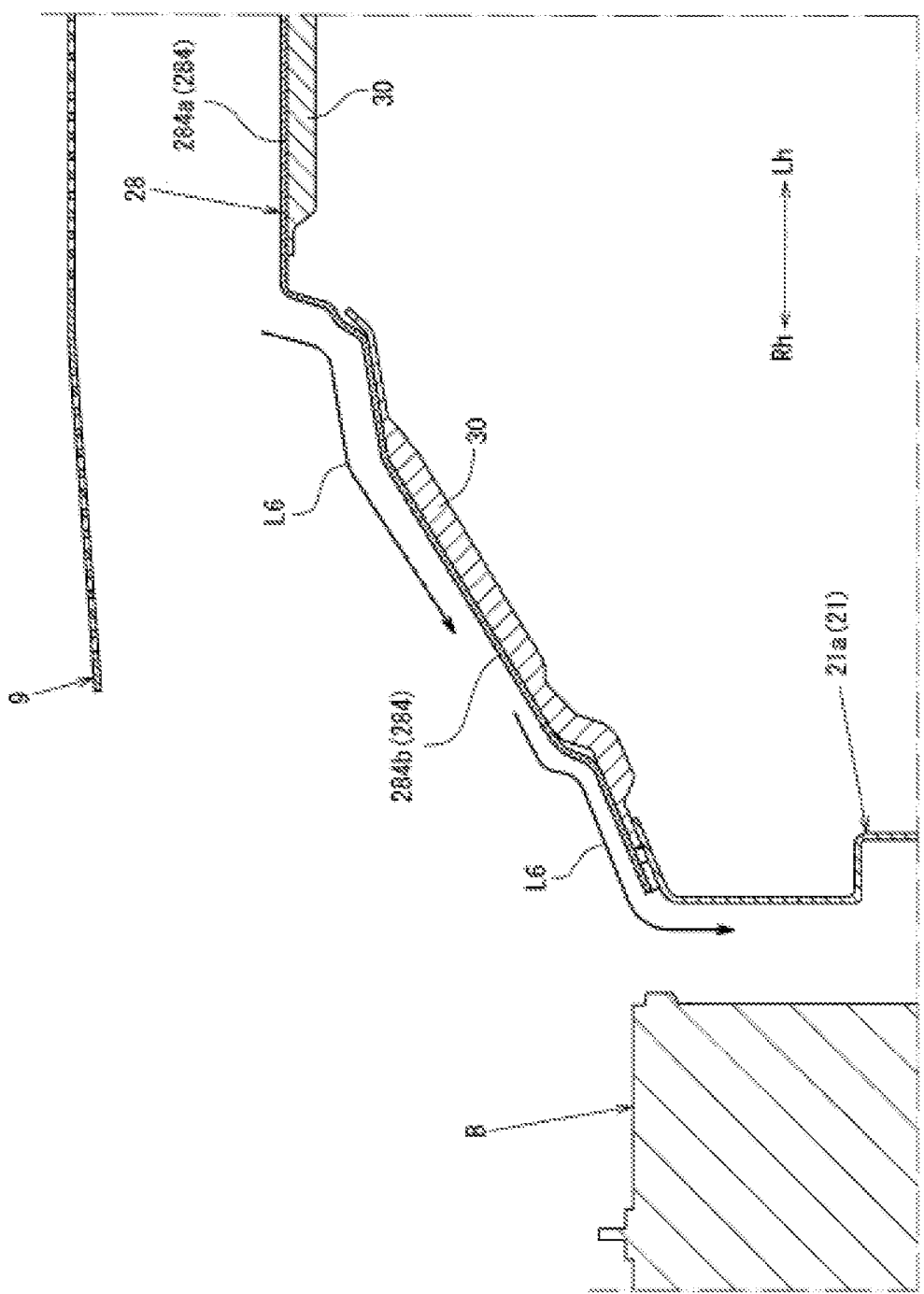
FIG. 8 is an arrow cross-sectional view taken along B-B in FIG. 1.
Figure 9:
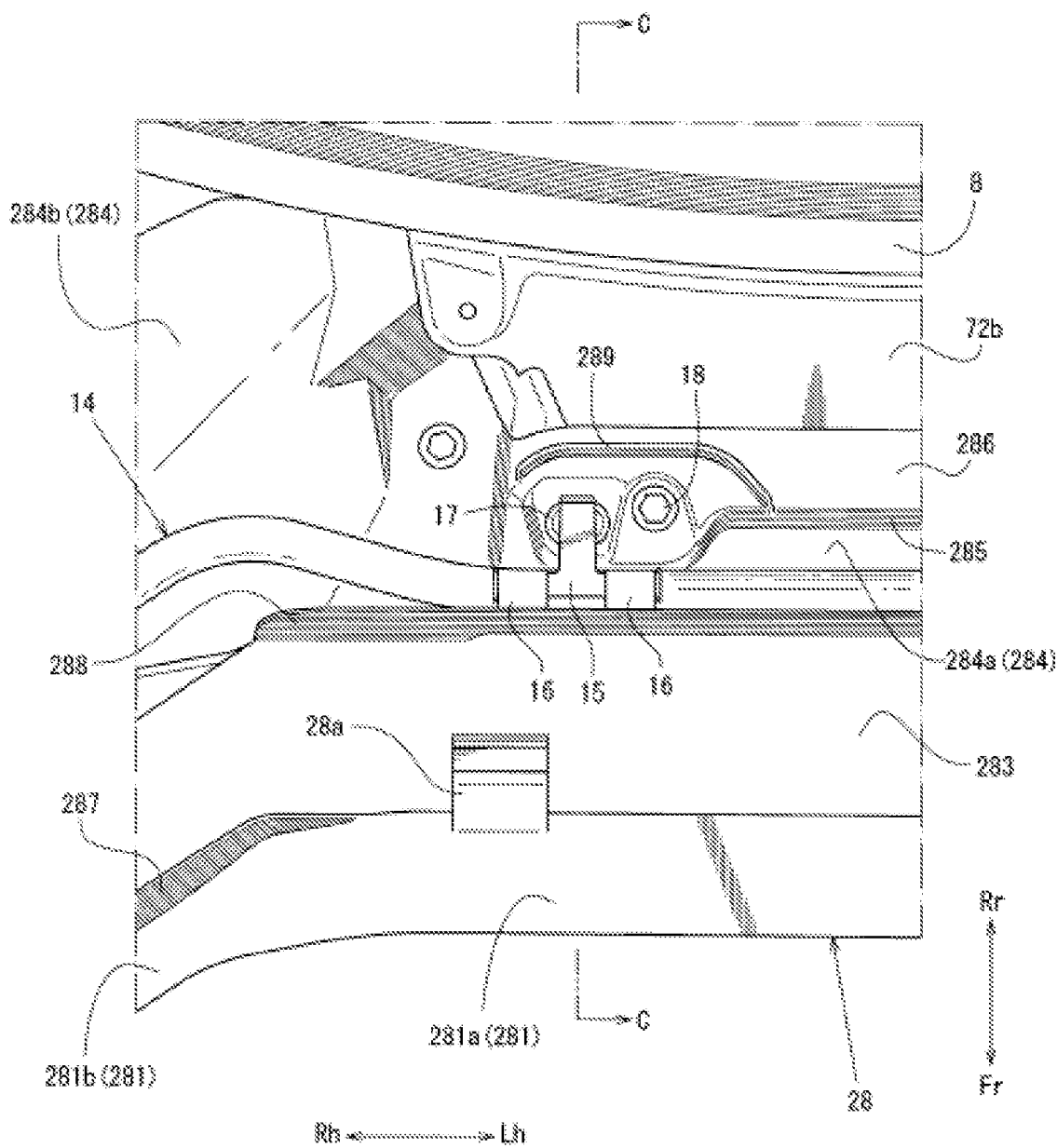
FIG. 9 is a plan view illustrating an external appearance around a fixing part of a wire harness in a planar view.
Figure 10:
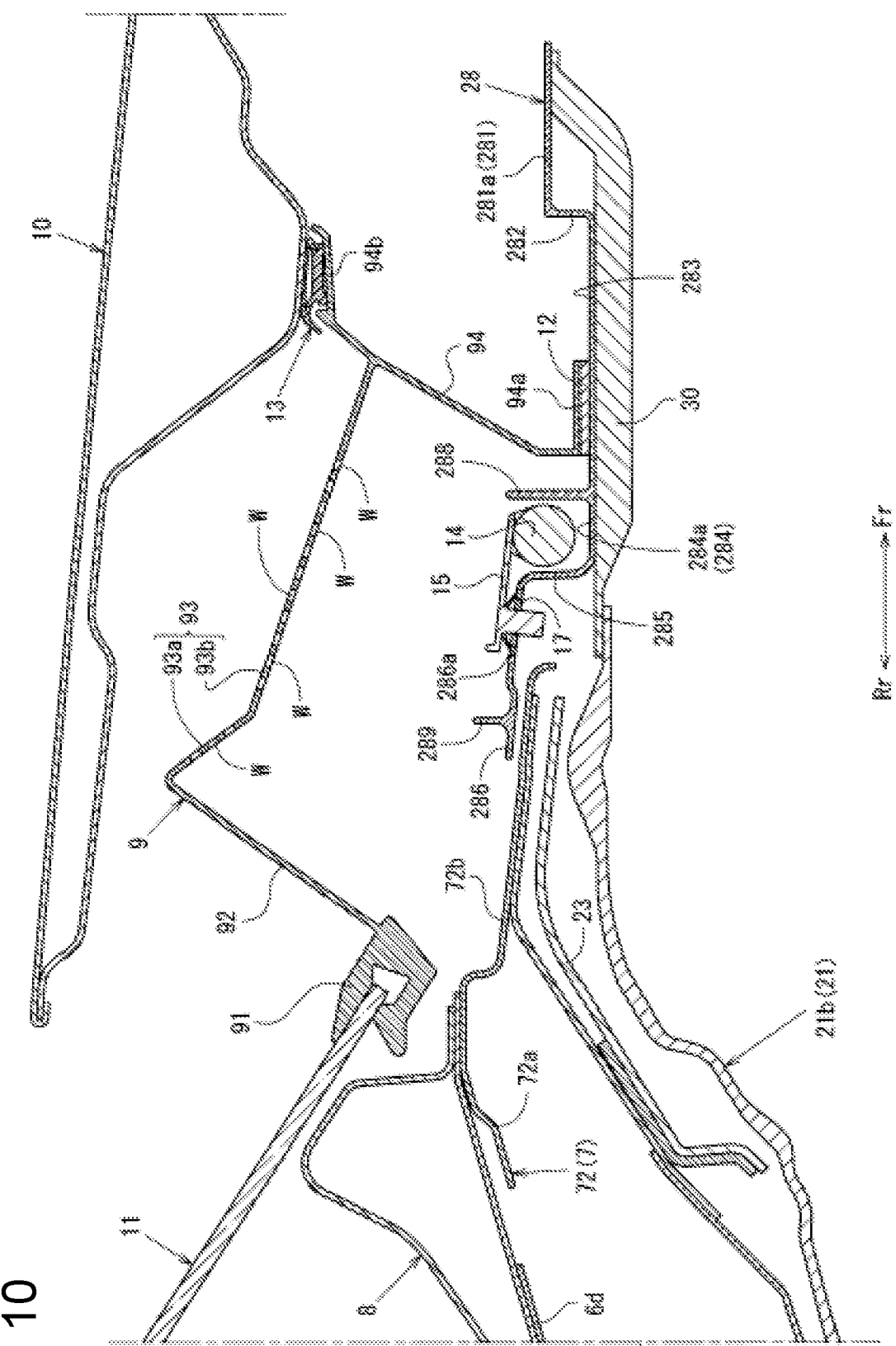
FIG. 10 is an arrow cross-sectional view taken along C-C in FIG. 9.

Furthermore, FIG. 5 illustrates an external perspective view of a cover member 20 as seen from a vehicle front side, FIG. 6 illustrates a principal-portion external perspective view of a cover top plate portion 27, and FIG. 7 illustrates an external perspective view of a vehicle rear upper side in a top plate rear portion 28. Moreover, FIG. 8 illustrates an arrow cross-sectional view taken along B-B in FIG. 1, FIG. 9 illustrates a plan view of a portion around a fixing part of a wire harness 14, and FIG. 10 illustrates an arrow cross-sectional view taken along C-C in FIG. 9.

Further, in FIG. 1 and FIG. 2, for making illustrations clear, an illustration of a bonnet 10 is omitted, and an engine E is illustrated by two-dot chain lines in FIG. 1. Furthermore, in FIG. 2, for making illustrations clear, an illustration of the wire harness 14 is omitted. In addition, in FIG. 5, for making an illustration of a right inner shell portion 21 clear, a right lower outer shell portion 22 is illustrated by two-dot chain lines.

Further, in the drawings, an arrow Fr and an arrow Rr indicate a front-rear direction, the arrow Fr indicates a front side, and the arrow Rr indicates a rear side. Furthermore, an arrow Rh and an arrow Lh indicate a vehicle width direction, the arrow Rh indicates a right direction, and the arrow Lh indicates a left direction.

As illustrated in FIG. 1 and FIG. 2, the vehicle front portion 1 includes a pair of left and right front side frames 2 extending in the vehicle front-rear direction and a pair of left and right apron reinforcements 3 in positions spaced apart at predetermined intervals in the vehicle width direction. Furthermore, as illustrated in FIG. 1 and FIG. 2, the vehicle front portion 1 includes a pair of left and right suspension towers 4 and a connecting member 5 that couple the front side frames 2 and the apron reinforcements 3 together.

In addition, as illustrated in FIG. 3, the vehicle front portion 1 includes a dash panel 6, a dash upper panel 7, and a cowl panel 8, which partition a vehicle cabin interior from a vehicle cabin exterior on a vehicle rear side of the front side frames 2, and the cowl grille 9 disposed on a vehicle upper side of the dash upper panel 7.

Moreover, as illustrated in FIG. 1 to FIG. 4, the vehicle front portion 1 includes the engine E and the cover member 20 covering the engine E in an engine room S composed of the left and right front side frames 2, the left and right apron reinforcements 3, and the dash panel 6.

More specifically, as illustrated in FIG. 1, the pair of left and right front side frames 2 are vehicle body framework members extending in the vehicle front-rear direction on a vehicle lower side in the vehicle front portion 1. This front side frame 2 is configured such that a cross-sectional shape in a vertical cross-section along the vehicle width direction is a closed cross-section.

Further, as illustrated in FIG. 1, the pair of left and right apron reinforcements 3 are disposed in positions on vehicle upper sides and vehicle-width-direction outer sides of the front side frames 2. This apron reinforcement 3 is configured such that a cross-sectional shape in a vertical cross-section along the vehicle width direction is a closed cross-section.

Further, the pair of left and right suspension towers 4 are support members supporting suspensions of the vehicle.

As illustrated in FIG. 1, the suspension tower 4 couples general centers of the front side frame 2 and the apron reinforcement 3 together in the vehicle front-rear direction. Note that as illustrated in FIG. 1 and FIG. 2, a battery B is disposed on a vehicle rear side of the suspension tower 4 on a right side in the vehicle width direction.

Further, as illustrated in FIG. 1, the connecting member 5 couples front ends of the front side frames 2 and front ends of the apron reinforcements 3 together in a vehicle up-down direction. Further, as illustrated in FIG. 3, the dash panel 6 is a panel member partitioning the vehicle cabin from the engine room S.

As illustrated in FIG. 3, this dash panel 6 is integrally formed with a flat-plate-shaped front wall portion 6a having a thickness in the vehicle front-rear direction, an inclined portion 6b extending from an upper end of the front wall portion 6a to a vehicle front upper side, a standing portion 6c extending from the inclined portion 6b to a vehicle upper side, and a flange portion 6d extending from an upper end of the standing portion 6c to the vehicle front upper side.

Furthermore, as illustrated in FIG. 4, in the front wall portion 6a of the dash panel 6, an opening V causing spaces of the vehicle cabin interior and exterior to communicate with each other is formed to open in an upper portion on the right side in the vehicle width direction. This opening V is formed to open as an introduction opening introducing outside air into an air-conditioning device (not illustrated) provided in the vehicle cabin, for example.

Further, as illustrated in FIG. 3, the dash upper panel 7 is joined to an upper end of the dash panel 6 and couples back ends of the apron reinforcements 3 together in the vehicle width direction. Specifically, as illustrated in FIG. 3, in a vertical cross-section along the vehicle front-rear direction, the dash upper panel 7 is composed of a dash upper body 71 joined to an upper surface of the flange portion 6d in the dash panel 6 and a dash upper protrusion 72 protruding from the dash upper body 71 to the vehicle front side.

As illustrated in FIG. 2 and FIG. 3, the dash upper body 71 is formed into a general arc shape in a planar view, whose general center in the vehicle width direction protrudes to the vehicle front side. As illustrated in FIG. 3, the cross-sectional shape of the dash upper body 71 in a vertical cross-section along the vehicle front-rear direction is formed into a general flat-plate shape having a thickness in the vehicle up-down direction. Note that as illustrated in FIG. 3, the dash upper body 71 is formed into a shape having a back end on a vehicle rear side of a joining part to the dash panel 6.

As illustrated in FIG. 2 and FIG. 3, the dash upper protrusion 72 is formed into a general plate shape having a shorter length in the vehicle width direction than the dash upper body 71. Describing that in detail, as illustrated in FIG. 3, the dash upper protrusion 72 is integrally formed with a joined portion 72a joined to a lower surface of the dash upper body 71 and a protrusion portion 72b protruding to the vehicle front side of the dash upper body 71.

As illustrated in FIG. 3, the joined portion 72a is joined to the lower surface of the dash upper body 71 on the vehicle front side of the flange portion 6d of the dash panel 6. Meanwhile, as illustrated in FIG. 2, in a predetermined range from a general center in the vehicle width direction to a vehicle-width outer side, the protrusion portion 72b protrudes from a front end of the dash upper body 71 to the vehicle front side and is formed into a generally rectangular shape in a planar view.

Further, as illustrated in FIG. 1 to FIG. 3, the cowl panel 8 is joined to an upper surface of the dash upper body 71 in the dash upper panel 7 and couples the back ends of the apron reinforcements 3 together in the vehicle width direction.

As illustrated in FIG. 3, the cross-sectional shape of the cowl panel 8 in a vertical cross-section along the vehicle front-rear direction is formed into a general hat shape, as a cross-section, protruding to the vehicle upper side. Moreover, a front end and a back end of the cowl panel 8 are respectively joined to the front end and the back end of the dash upper body 71 in the dash upper panel 7, and the cowl panel 8 thereby forms a closed cross-section extending in the vehicle width direction.

Further, as illustrated in FIG. 3, the cowl grille 9 is a synthetic resin member blocking a gap between the bonnet 10 and a lower end of windshield glass 11. As illustrated in FIG. 1 and FIG. 2, this cowl grille 9 is formed into a shape extending in the vehicle width direction along the cowl panel 8 so as to cover the protrusion portion 72b of the dash upper panel 7 from the vehicle upper side Note that as illustrated in FIG. 1 and FIG. 2, the cowl grille 9 is formed into a shape in which a generally central portion in the vehicle width direction protrudes to the vehicle front side along a front end edge of the dash upper panel 7 in a planar view. More specifically, as illustrated in FIG. 3, in generally the same position in the vehicle front-rear direction as the front end of the dash upper body 71, the cowl grille 9 is integrally formed with a grip portion 91 gripping the lower end of the windshield glass 11 and a grille rear wall portion 92, a grille top face portion 93, and a grille front face portion 94 that are provided to extend from the grip portion 91.

As illustrated in FIG. 3, the grille rear wall portion 92 is provided to extend from the grip portion 91 to the vehicle upper side and slightly to the vehicle front side. As illustrated in FIG. 3, the grille top face portion 93 is composed of a perpendicular surface portion 93a provided to generally perpendicularly extend from an upper end of the grille rear wall portion 92 to a vehicle front lower side and a horizontal surface portion 93b provided to generally horizontally extend from the perpendicular surface portion 93a to the vehicle front side and slightly to the vehicle lower side.

As illustrated in FIG. 1 and FIG. 3, in this grille top face portion 93, plural outside air introduction holes W for introducing outside air into the opening V of the dash panel 6 are formed to open in each of the perpendicular surface portion 93a and the horizontal surface portion 93b. Note that as illustrated in FIG. 1 and FIG. 2, the outside air introduction holes W are formed in generally central portions in the vehicle width direction that are opposed to the protrusion portion 72b.

As illustrated in FIG. 3, the grille front face portion 94 is provided to extend from a front end of the grille top face portion 93 to the vehicle lower side so as to block a portion between the front end of the grille top face portion 93 and the cover member 20 (a front side bottom portion 283 of a top plate rear portion 28 which will be described later). Furthermore, as illustrated in FIG. 3, at a lower end of the grille front face portion 94, a folded portion 94a is provided which is folded to the vehicle front side so as to face the cover member 20 (the front side bottom portion 283 of the top plate rear portion 28 which will be described later) in the vehicle up-down direction.

As illustrated in FIG. 3, a sealing member 12 blocking a gap is disposed between the folded portion 94a of the grille front face portion 94 and the cover member 20 (the front side bottom portion 283 of the top plate rear portion 28 which will be described later). Note that the sealing member 12 has heat resistance and water stopping performance.

In addition, as illustrated in FIG. 3, the grille front face portion 94 is integrally formed with an upper end portion 94b provided to extend from the front end of the grille top face portion 93 to the vehicle upper side and to then extend to the vehicle front side. This upper end portion 94b is formed as a portion for placing a sealing member 13 blocking a gap from the bonnet 10.

Further, as illustrated in FIG. 1, the engine E is disposed between the front side frames 2. This engine E is a longitudinal engine, for example. Further, as illustrated in FIG. 1, FIG. 2, and FIG. 4, the cover member 20 is a heat shielding member covering the engine E from the vehicle-width-direction outer sides, vehicle rear side, and vehicle upper side on a vehicle rear side of the suspension towers 4.

As illustrated in FIG. 4 and FIG. 5, this cover member 20 is composed of left and right cover side faces opposed to each other in the vehicle width direction with the engine E interposed therebetween, a cover rear face covering a vehicle rear side of the engine E, and a cover top plate portion covering a vehicle upper side of the engine E.

Specifically, as illustrated in FIG. 5, the cover member 20 includes the right inner shell portion 21 covering a right half of the engine E in the vehicle width direction, the right lower outer shell portion 22 supporting a lower portion of the right inner shell portion 21, and a right upper outer shell portion 23 supporting an upper portion of the right inner shell portion 21.

Furthermore, as illustrated in FIG. 5, the cover member 20 includes a left inner shell portion 24 covering a left half of the engine E in the vehicle width direction, a left lower outer shell portion 25 supporting a lower portion of the left inner shell portion 24, and a left upper outer shell portion 26 supporting an upper portion of the left inner shell portion 24. In addition, as illustrated in FIG. 1, the cover member 20 includes the cover top plate portion 27 covering the vehicle upper side of the engine E.

The right inner shell portion 21 is a heat insulator made of a heat shielding material. As illustrated in FIG. 4 and FIG. 5, this right inner shell portion 21 is integrally formed with a right side face portion 21a facing a right side surface of the engine E on the vehicle-width-direction outer side and a right rear face portion 21b extending from a back end of the right side face portion 21a to a general center in the vehicle width direction while going around to the vehicle rear side of the engine E.

Note that the lower portion of the right inner shell portion 21 is fixed to a surface of the front side frame 2 on a vehicle-width-direction inner side, and the upper portion is fixed to the suspension tower 4 via the right lower outer shell portion 22 and the right upper outer shell portion 23. The right lower outer shell portion 22 is a support member made of metal and fixed to the suspension tower 4. As indicated by the two-dot chain lines in FIG. 5, this right lower outer shell portion 22 is formed into a shape having a side surface adjacently opposed to the right side face portion 21a of the right inner shell portion 21.

As illustrated in FIG. 5, the right upper outer shell portion 23 is a support member made of metal and is formed into a shape having a side surface separated from the right side face portion 21a of the right inner shell portion 21 to the vehicle-width-direction outer side. A lower end of this right upper outer shell portion 23 is coupled with an upper end of the right lower outer shell portion 22. In other words, the right upper outer shell portion 23 is formed to define a space extending in the vehicle front-rear direction together with the right side face portion 21a of the right inner shell portion 21.

The left inner shell portion 24 is a heat insulator made of a heat shielding material. As illustrated in FIG. 4 and FIG. 5, this left inner shell portion 24 is integrally formed with a left side face portion 24a facing a left side surface of the engine E on the vehicle-width-direction outer side and a left rear face portion 24b extending from a back end of the left side face portion 24a to a general center in the vehicle width direction while going around to the vehicle rear side of the engine E.

Note that the lower portion of the left inner shell portion 24 is fixed to a surface of the front side frame 2 on the vehicle-width-direction inner side, and the upper portion is fixed to the suspension tower 4 via the left lower outer shell portion 25 and the left upper outer shell portion 26. Furthermore, the left rear face portion 24b of the left inner shell portion 24 is disposed to overlap with the right rear face portion 21b of the right inner shell portion 21 on the vehicle rear side of the engine E.

The left lower outer shell portion 25 is a support member made of metal and fixed to the suspension tower 4. As illustrated in FIG. 5, this left lower outer shell portion 25 is formed into a shape having a side surface separated from the left side face portion 24a of the left inner shell portion 24 to the vehicle-width-direction outer side.

As illustrated in FIG. 5, the left upper outer shell portion 26 is a support member made of metal and is formed into a shape having a side surface separated from the left side face portion 24a of the left inner shell portion 24 to the vehicle-width-direction outer side. A lower end of this left upper outer shell portion 26 is coupled with an upper end of the left lower outer shell portion 25. Thus, the left lower outer shell portion 25 and the left upper outer shell portion 26 define a space extending in the vehicle front-rear direction together with the left side face portion 24a of the left inner shell portion 24.

As illustrated in FIG. 2, FIG. 4, and FIG. 5, the cover top plate portion 27 is composed of the top plate rear portion 28 coupling an upper end of the right upper outer shell portion 23 and an upper end of the left upper outer shell portion 26 together in the vehicle width direction and a top plate front portion 29 pivotably supported to be capable of opening and closing with respect to the top plate rear portion 28.

As illustrated in FIG. 3, the top plate rear portion 28 is arranged below the cowl grille 9. As illustrated in FIG. 3, a heat insulator 30 as a heat shielding material is mounted on a lower surface of this top plate rear portion 28. Note that top plate rear portion 28 will be described in detail later.

As illustrated in FIG. 2, the top plate front portion 29 is formed into a flat-plate shape in a generally rectangular shape in a planar view, the flat-plate shape having: a length in the vehicle width direction, the length being slightly narrower than an interval between the left and right front side frames 2 in a planar view; and a length in the vehicle front-rear direction, the length ranging from the top plate rear portion 28 to the front ends of the front side frames 2.

As illustrated in FIG. 6, this top plate front portion 29 is integrally formed with a pair of left and right front hinges 29a in positions spaced apart at a predetermined interval in the vehicle width direction. Note that as illustrated in FIG. 3, a heat insulator 31 as a heat shielding material is mounted on a lower surface of this top plate front portion 29.

As described above, in the cover member 20, a cover side face 20a covering the engine E from the right side in the vehicle width direction is composed of the right side face portion 21a of the right inner shell portion 21, the right lower outer shell portion 22, and the right upper outer shell portion 23, and a cover side face 20b covering the engine E from a left side in the vehicle width direction is composed of the left side face portion 24a of the left inner shell portion 24, the left lower outer shell portion 25, and the left upper outer shell portion 26.

Furthermore, in the cover member 20, a cover rear face 20c covering the engine E from the vehicle rear side is composed of the right rear face portion 21b of the right inner shell portion 21 and the left rear face portion 24b of the left inner shell portion 24. The above-described top plate rear portion 28 of the cover top plate portion 27 will continue to be described more in detail.

As illustrated in FIG. 3 and FIG. 5 to FIG. 7, the top plate rear portion 28 of the cover top plate portion 27 is integrally formed with a front side edge portion 281 overlapping with a back end edge of the top plate front portion 29 on the vehicle lower side and a front wall portion 282 extending from a back end of the front side edge portion 281 to the vehicle lower side.

Furthermore, as illustrated in FIG. 3 and FIG. 5 to FIG. 7, in the top plate rear portion 28, a front side bottom portion 283 and a rear side bottom portion 284 that extend from a lower end of the front wall portion 282 to the vehicle rear side, a rear wall portion 285 extending from a back end of the rear side bottom portion 284 to the vehicle upper side, and a rear side edge portion 286 extending from an upper end of the rear wall portion 285 to the vehicle rear side are integrally formed.

In addition, as illustrated in FIG. 3 and FIG. 5 to FIG. 7, the top plate rear portion 28 is integrally formed with left and right first ribs 287 provided in a protruding manner at the back end of the front side edge portion 281, a second rib 288 provided in a protruding manner at a back end of the front side bottom portion 283, and a pair of left and right third ribs 289 provided in a protruding manner on the rear side edge portion 286. Moreover, in the top plate rear portion 28, a water draining path extending in the vehicle width direction and draining water such as rainwater entering through the outside air introduction holes W is composed of the rear side bottom portion 284, the rear wall portion 285, and the second rib 288.

Specifically, as illustrated in FIG. 5 to FIG. 7, the front side edge portion 281 is formed to have generally the same length in the vehicle width direction as the top plate front portion 29. Note that as illustrated in FIG. 2, FIG. 4, and FIG. 5, both ends of the front side edge portion 281 in the vehicle width direction are respectively fixed to the right upper outer shell portion 23 and the left upper outer shell portion 26.

As illustrated in FIG. 3 to FIG. 7, this front side edge portion 281 is formed with a central portion 281a having generally the same length in the vehicle width direction as the protrusion portion 72b of the dash upper protrusion 72 and having a generally horizontal upper surface and inclined portions 281b gradually inclined to the vehicle lower side from both ends of the central portion 281a in the vehicle width direction toward vehicle-width outer sides. Furthermore, as illustrated in FIG. 2 and FIG. 6, a back end edge of the inclined portion 281b of the front side edge portion 281 is formed into a shape in which the back end edge is gradually positioned on the vehicle front side toward the vehicle-width-direction outer side.

As illustrated in FIG. 3, the front side bottom portion 283 is a portion that the grille front face portion 94 of the cowl grille 9 abuts via the sealing member 12. As illustrated in FIG. 2, FIG. 4, and FIG. 5, both ends of the front side bottom portion 283 in the vehicle width direction are respectively fixed to the right upper outer shell portion 23 and the left upper outer shell portion 26.

More specifically, as illustrated in FIG. 5 to FIG. 7, the front side bottom portion 283 is formed into a general flat-plate shape extending from one end to the other end of the front side edge portion 281 in the vehicle width direction along a back end edge of the front side edge portion 281. As illustrated in FIG. 3, in a vertical cross-section along the vehicle front-rear direction, this front side bottom portion 283 is formed into a general flat-plate shape having a generally horizontal upper surface.

Note that as illustrated in FIG. 3, the front side bottom portion 283 is formed to have a length in the vehicle front-rear direction in which the back end is positioned slightly on the vehicle rear side of the grille front face portion 94 of the cowl grille 9. In addition, in the front side bottom portion 283, as illustrated in FIG. 6 and FIG. 7, in positions spaced apart at a predetermined interval in the vehicle width direction, rear hinges 28a rotatably supporting the front hinges 29a of the top plate front portion 29 are integrally formed across the front side edge portion 281.

As illustrated in FIG. 3, FIG. 6, and FIG. 7, the rear side bottom portion 284 is composed of a central portion 284a opposed to the outside air introduction holes W provided to the horizontal surface portion 93b of the cowl grille 9 on the vehicle lower side and inclined portions 284b extending from the central portion 284a to the vehicle-width-direction outer sides. Note that as illustrated in FIG. 2, FIG. 4, and FIG. 5, the right and left inclined portions 284b are fixed to the right upper outer shell portion 23 and the left upper outer shell portion 26.

More specifically, as illustrated in FIG. 2, FIG. 6, and FIG. 7, the central portion 284a of the rear side bottom portion 284 is formed to be in a generally rectangular shape in a planar view, which is long in the vehicle width direction, and to have generally the same length in the vehicle width direction as the protrusion portion 72b of the dash upper protrusion 72.

As illustrated in FIG. 3, in a vertical cross-section along the vehicle front-rear direction, this central portion 284a is formed into a flat-plate shape having a generally horizontal upper surface continuous with the front side bottom portion 283. Note that the central portion 284a is slightly inclined to the vehicle lower side from a general center in the vehicle width direction toward the vehicle-width-direction outer sides.

Meanwhile, as illustrated in FIG. 8, in a vertical cross-section along the vehicle width direction, the inclined portion 284b of the rear side bottom portion 284 is formed into a shape having an upper surface gradually inclined to the vehicle lower side from the central portion 284a toward the vehicle-width-direction outer side.

Note that as illustrated in FIG. 8, in a vertical cross-section along the vehicle width direction, the inclined portion 284b on the right side in the vehicle width direction is formed into a shape having an upper surface inclined toward a position on the vehicle lower side of an upper surface of the battery B.

In other words, as illustrated in FIG. 8, a lower end on the vehicle-width-direction outer side in the inclined portion 284b on the right side in the vehicle width direction is positioned on the vehicle lower side of the upper surface of the battery B. Note that as illustrated in FIG. 2, FIG. 6, and FIG. 7, in a planar view, the inclined portion 284b is formed into a shape provided to extend to the vehicle rear side so as to cover a vehicle-width-direction outer side of the protrusion portion 72b of the dash upper protrusion 72.

As illustrated in FIG. 9, the wire harness 14 extending in the vehicle width direction is disposed for such a rear side bottom portion 284. As illustrated in FIG. 9, the wire harness 14 is fixed to the rear side edge portion 286 of the top plate rear portion 28 via harness fasteners 15 in a general T shape in a planar view. Note that as illustrated in FIG. 9, the harness fastener 15 is fixed to the wire harness 14 by adhesive tape 16.

As illustrated in FIG. 3, FIG. 6, and FIG. 7, the rear side edge portion 286 is a portion opposed to the outside air introduction holes W provided to the perpendicular surface portion 93a of the cowl grille 9. As illustrated in FIG. 6 and FIG. 7, this rear side edge portion 286 is formed to be in a generally rectangular shape in a planar view, which is long in the vehicle width direction, and to have generally the same length in the vehicle width direction as the protrusion portion 72b of the dash upper protrusion 72.

Furthermore, as illustrated in FIG. 3, in a vertical cross-section along the vehicle front-rear direction, the rear side edge portion 286 is formed with an inclined surface that is inclined along the protrusion portion 72b of the dash upper protrusion 72 such that a back end of the inclined surface is positioned on the vehicle upper side with respect to a front end.

Note that the rear side edge portion 286 is slightly inclined to the vehicle lower side from a general center in the vehicle width direction toward the vehicle-width-direction outer sides. In addition, as illustrated in FIG. 6, FIG. 7, and FIG. 10, harness mounting holes 286a on which the harness fasteners 15 are mounted are formed to open around both ends of the rear side edge portion 286 in the vehicle width direction.

As illustrated in FIG. 10, a sealing member 17 blocking a gap from the harness fastener 15 is mounted on this harness mounting hole 286a. The sealing member 17 has heat resistance and water stopping performance Note that as illustrated in FIG. 9, bolt insertion holes (not illustrated) for inserting bolts 18 are formed to open on the vehicle-width-direction inner sides of the harness mounting holes 286a, the bolts 18 fastening and fixing the top plate rear portion 28 to the right upper outer shell portion 23 and to the left upper outer shell portion 26.

As illustrated in FIG. 5 and FIG. 7, the first ribs 287 are provided in a protruding manner around both ends of the front side bottom portion 283 in the vehicle width direction. More specifically, as illustrated in FIG. 5 and FIG. 7, the first rib 287 is formed into a shape in which a vertical wall blocking a portion between the inclined portion 281b of the front side edge portion 281 and the front side bottom portion 283 is provided to further extend to the vehicle upper side.

As illustrated in FIG. 3, the second rib 288 is provided in a protruding manner in a position in the vehicle front-rear direction close to the grille front face portion 94 between the rear wall portion 285 and the grille front face portion 94 of the cowl grille 9. In other words, in a vertical cross-section along the vehicle front-rear direction, the second rib 288 is adjacent to the grille front face portion 94 of the cowl grille 9 on the vehicle rear side. As illustrated in FIG. 5 to FIG. 7, this second rib 288 is formed to have a length in the vehicle width direction, the length ranging from the inclined portion 284b on the right side in the vehicle width direction to the inclined portion 284b on the left side in the vehicle width direction.

As illustrated in FIG. 6, FIG. 7, FIG. 9, and FIG. 10, the third rib 289 is formed into a shape extending in the vehicle width direction so as to integrally cover the harness mounting hole 286a and a bolt mounting hole. In other words, the third ribs 289 are formed adjacently to fixing parts between the top plate rear portion 28 and the wire harness 14 and to fixing parts between the top plate rear portion 28 and outer shell portions (the right upper outer shell portion 23 and the left upper outer shell portion 26).

Next, a description will be made about a flow of water that flows on the top plate rear portion 28 of the cover top plate portion 27 when water such as rainwater enters the outside air introduction holes W of the cowl grille 9 together with outside air. First, the water entering through the outside air introduction holes W provided to the perpendicular surface portion 93a of the grille top face portion 93 (see an arrow L1 in FIG. 3) drips onto the rear side edge portion 286 of the top plate rear portion 28 and thereafter flows and moves toward the central portion 284a of the rear side bottom portion 284 as indicated by an arrow L2 in FIG. 3.

In this case, as indicated by an arrow L3 in FIG. 7, the water dripping onto the rear side edge portion 286 on the vehicle rear side of the third rib 289 is hindered from flowing and moving to the vehicle front side by the third rib 289 and flows and moves to the vehicle-width-direction outer side, that is, toward the inclined portion 284b of the rear side bottom portion 284.

Further, as indicated by arrows L4 in FIG. 3, the water entering through the outside air introduction holes W provided to the horizontal surface portion 93b of the grille top face portion 93 drips toward the rear side bottom portion 284 of the top plate rear portion 28. As indicated by an arrow L5 in FIG. 7, this water dripping onto the rear side bottom portion 284 is hindered from flowing and moving to the vehicle front side by the second rib 288 and flows and moves to the vehicle-width-direction outer side, that is, toward the inclined portion 284b of the rear side bottom portion 284. Subsequently, as indicated by an arrow L6 in FIG. 8, the water reaching the inclined portion 284b of the rear side bottom portion 284 is discharged to a portion between the battery B and the cover member 20 along the inclined portion 284b.

As described above, a vehicle front structure includes the dash upper panel 7 extending in the vehicle width direction in an upper portion of the dash panel 6 and a lateral wall (grille top face portion 93) extending in the vehicle width direction on a vehicle upper side of the dash upper panel 7 and having the outside air introduction holes W taking in outside air.

This vehicle front structure includes the cover member 20 covering at least the engine E from the vehicle upper side and having an opposed portion (top plate rear portion 28) opposed to the lateral wall (grille top face portion 93) on the vehicle lower side throughout a predetermined range in the vehicle width direction, the predetermined range including the outside air introduction holes W, and a vertical wall (grille front face portion 94) extending in the vehicle width direction on a vehicle front side of the outside air introduction holes W and disposed from the lateral wall (grille top face portion 93) to the opposed portion (top plate rear portion 28) of the cover member 20.

Moreover, the opposed portion (top plate rear portion 28) of the cover member 20 is formed into a shape having inclined surfaces extending from a vehicle lower side of the outside air introduction holes W in the vehicle width direction, the inclined surfaces being gradually inclined to the vehicle lower side toward the vehicle-width-direction outer sides.

Accordingly, in the vehicle front structure, water such as rainwater entering through the outside air introduction holes W can be received by the opposed portion (top plate rear portion 28) of the cover member 20. Furthermore, because the opposed portion (top plate rear portion 28) of the cover member 20 is formed into the shape having the inclined surfaces, the vehicle front structure can cause water such as rainwater to flow and move to the vehicle-width-direction outer sides along the inclined surfaces of the opposed portion (top plate rear portion 28).

In this case, because the vertical wall (grille front face portion 94) is provided on the vehicle front side of the outside air introduction holes W, the vehicle front structure can inhibit water such as rainwater from flowing and moving to the vehicle front side. In other words, in the vehicle front structure, a water draining path is composed of the vertical wall (grille front face portion 94) and the opposed portion (top plate rear portion 28) of the cover member 20, the water draining path extending in the vehicle width direction on the vehicle lower side of the outside air introduction holes W and draining water such as rainwater to the vehicle-width-direction outer sides of the engine room S.

Accordingly, the vehicle front structure can prevent wetting of the engine E in the engine room S or a vehicle component even in a vehicle in which a cowl box is not provided on the vehicle lower side of the outside air introduction holes W.

Further, the cover member 20 includes the cover top plate portion 27 having the opposed portion (top plate rear portion 28) and covering the engine E from the vehicle upper side, the left and right cover side faces 20a and 20b covering the engine E from the vehicle-width-direction outer sides, and the cover rear face 20c covering the engine E from the vehicle rear side.

Furthermore, the lateral wall (grille top face portion 93) and the vertical wall (grille front face portion 94) are respectively composed of the grille top face portion 93 and the grille front face portion 94, the grille top face portion 93 being a top face of the cowl grille 9 mounted on the dash upper panel 7, the grille front face portion 94 being a front face of the cowl grille 9. Moreover, the vehicle front structure includes the sealing member 12 between the grille front face portion 94 and the cover top plate portion 27.

In this configuration, the vehicle front structure can cover the engine E by the cover member 20 composed of the cover top plate portion 27, the left and right cover side faces 20a and 20b, and the cover rear face 20c and can thus efficiently perform shielding against radiant heat of the engine E.

Furthermore, the vehicle front structure can inhibit hot air in the engine room S from entering through a gap between the grille front face portion 94 and the cover top plate portion 27 by the sealing member 12. Thus, the vehicle front structure can prevent hot air in the engine room S from being introduced into the air-conditioning device together with outside air introduced through the outside air introduction holes W, for example.

In addition, the sealing member 12 is provided between the grille front face portion 94 and the cover top plate portion 27, and the vehicle front structure can thereby inhibit water entering through the outside air introduction holes W from leaking through the gap between the grille front face portion 94 and the cover top plate portion 27 by the sealing member 12. Accordingly, the vehicle front structure can reduce a thermal influence on the outside air introduced through the outside air introduction holes W and can prevent wetting of the engine E in the engine room S or the vehicle component.

Further, the cover top plate portion 27 is composed of the top plate rear portion 28 and the top plate front portion 29 that is disposed on a vehicle front side with respect to the top plate rear portion 28 and pivotably supported by the top plate rear portion 28 via the front hinges 29a. Moreover, the grille front face portion 94 is disposed on a vehicle rear side of a rotation center of the top plate front portion 29.

In this configuration, the vehicle front structure can certainly prevent wetting of the engine E in the engine room S or the vehicle component. Specifically, in a case where the grille front face portion is provided on the vehicle front side of the rotation center of the top plate front portion, because the grille front face portion overlaps with the front hinges of the top plate front portion, notches enabling the front hinges to rotate have to be provided to the grille front face portion. Thus, in a case where the notches are provided to the grille front face portion, it is anticipated that water such as rainwater will leak to the vehicle front side through the notches in the grille front face portion.

However, because the grille front face portion 94 is provided on the vehicle rear side of the rotation center of the top plate front portion 29, notches do not have to be provided in the grille front face portion 94 in the vehicle front structure. Thus, the vehicle front structure can inhibit water such as rainwater from flowing and moving to the vehicle front side without hindering rotation of the top plate front portion 29. Accordingly, the vehicle front structure can certainly prevent wetting of the engine E in the engine room S or the vehicle component.

Further, the top plate rear portion 28 of the cover top plate portion 27 includes the second rib 288 being adjacent to the grille front face portion 94 on the vehicle rear side, being provided in a protruding manner to the vehicle upper side, and extending in the vehicle width direction.

In this configuration, the vehicle front structure can inhibit water flowing in through the outside air introduction holes W from reaching a portion between the grille front face portion 94 and the cover top plate portion 27. Thus, the vehicle front structure can more certainly prevent wetting of the engine E in the engine room S or the vehicle component.

Further, the vehicle front structure includes the wire harness 14 that is disposed on the vehicle lower side of the outside air introduction holes W and fixed to the top plate rear portion 28 of the cover top plate portion 27. Moreover, the top plate rear portion 28 of the cover top plate portion 27 includes the third ribs 289 being adjacent to the fixing parts of the wire harness 14 on the vehicle rear side and being provided in a protruding manner to the vehicle upper side.

In this configuration, the vehicle front structure can prevent water flowing in through the outside air introduction holes W from entering the fixing parts of the wire harness 14 along the cover top plate portion 27. Thus, the vehicle front structure can prevent leakage of water from the fixing parts of the wire harness 14. Accordingly, even in a case where the wire harness 14 is fixed to the top plate rear portion 28 of the cover top plate portion 27, the vehicle front structure can further certainly prevent wetting of the engine E in the engine room S or the vehicle component.

Further, the vehicle front structure includes the battery B disposed adjacently to the top plate rear portion 28 of the cover top plate portion 27 on the vehicle-width-direction outer side. Moreover, the cover top plate portion 27 is formed such that lower ends of the inclined surfaces in the top plate rear portion 28 are positioned on the vehicle lower side of an upper end of the battery B.

In this configuration, the vehicle front structure can prevent water flowing and moving along the inclined surfaces of the cover top plate portion 27 from contacting with the upper surface of the battery B. Thus, the vehicle front structure can prevent occurrence of an unintended problem due to wetting of the battery B.

In the correspondence between the configurations of this disclosure and the above-described embodiment, the lateral wall of this disclosure corresponds to the grille top face portion 93 of the embodiment, and the same applies to the following: the opposed portion corresponds to the top plate rear portion 28, the vertical wall corresponds to the grille front face portion 94, the inclined surface corresponds to the upper surface of the inclined portion 284*b*, the hinges correspond to the front hinge 29*a* and the rear hinge 28*a*, the front rib corresponds to the second rib 288, the vehicle component corresponds to the wire harness 14, the fixing part corresponds to the harness mounting hole 286*a*, and the rear rib corresponds to the third rib 289; however, this disclosure is not limited only to the configuration of the above-described embodiment and many embodiments can be given.

For example, in the above-described embodiment, the dash upper panel 7 is provided which is composed of the dash upper body 71 and the dash upper protrusion 72; however, a dash upper panel is not limited to this but may be a dash upper panel in which a dash upper body and a dash upper protrusion are integrally formed.

Further, a configuration is provided in which the grille top face portion 93 as the lateral wall having the outside air introduction holes W and the grille front face portion 94 as the vertical wall are integrally formed; however, a configuration is not limited to this, but the grille top face portion as the lateral wall and the grille front face portion as the vertical wall may be configured as separate bodies. Further, as long as the lateral wall and the vertical wall are a lateral wall having the outside air introduction hole W and a front wall portion disposed from the lateral wall to the cover member, those do not have to be the grille top face portion 93 and grille front face portion 94 of the cowl grille 9.

Further, the cover top plate portion 27 is provided which is composed of the top plate front portion 29 and the top plate rear portion 28; however, a cover top plate portion is not limited to this but may be a cover top plate portion in which a top plate front portion and a top plate rear portion are integrally formed. Further, the top plate front portion 29 is provided which is rotatably supported by the top plate rear portion 28; however, a top plate front portion is not limited to this but may be a top plate front portion which is detachably supported with respect to the top plate rear portion.

Further, the sealing member 12 interposed between the grille front face portion 94 of the cowl grille 9 and the front side bottom portion 283 of the cover top plate portion 27 is configured to have heat resistance and water stopping performance; however, in a case where the second rib 288 is provided to the top plate rear portion 28 of the cover top plate portion 27, it is sufficient that a sealing member has at least heat resistance.

Further, in addition to the second rib 288, the top plate rear portion 28 may include a rib being opposed to the second rib 288 on the vehicle rear side and extending in the vehicle width direction. Further, the wire harness 14 is provided as the vehicle component fixed to the cover top plate portion 27; however, a vehicle component is not limited to this but may be an appropriate component as long as that is a vehicle component fixed to the cover top plate portion 27. For example, a vehicle component may be electrical equipment such as a motor or a sensor.

What is claimed is:
1. A vehicle front structure comprising:
a dash upper panel extending in a vehicle width direction in an upper portion of a dash panel;
a lateral wall extending in the vehicle width direction on a vehicle upper side of the dash upper panel and having an outside air introduction hole taking in outside air;
a cover member covering at least an engine from a vehicle upper side and having an opposed portion opposed to the lateral wall on a vehicle lower side throughout a predetermined range in the vehicle width direction, the predetermined range including the outside air introduction hole, and the opposed portion of the cover member having a shape with an inclined surface extending from a vehicle lower side of the outside air introduction hole in the vehicle width direction, the inclined surface being gradually inclined to the vehicle lower side toward a vehicle-width-direction outer side; and a vertical wall extending in the vehicle width direction on a vehicle front side of the outside air introduction hole and disposed from the lateral wall to the opposed portion of the cover member.

2. The vehicle front structure according to claim 1, wherein the cover member includes:

a cover top plate portion having the opposed portion and covering the engine from the vehicle upper side;

left and right cover side faces covering the engine from vehicle-width-direction outer sides; and a cover rear face covering the engine from a vehicle rear side, the lateral wall and the vertical wall respectively include a grille top face portion and a grille front face portion, the grille top face portion being a top face of a cowl grille mounted on the dash upper panel, the grille front face portion being a front face of the cowl grille, and a sealing member is provided between the grille front face portion and the cover top plate portion.

3. The vehicle front structure according to claim 2, wherein the cover top plate portion includes a top plate rear portion that is the opposed portion, and a top plate front portion that is disposed on a vehicle front side with respect to the top plate rear portion and pivotably supported by the top plate rear portion via a hinge, and the grille front face portion is disposed on a vehicle rear side of a rotation center of the top plate front portion.

4. The vehicle front structure according to claim 3, wherein the opposed portion of the cover top plate portion includes a front rib that is adjacent to the grille front face portion on the vehicle rear side, is provided in a protruding manner to the vehicle upper side, and extends in the vehicle width direction.

5. The vehicle front structure according to claim 4, comprising a vehicle component that is disposed on the vehicle lower side of the outside air introduction hole and fixed to the opposed portion of the cover top plate portion, wherein the opposed portion of the cover top plate portion includes a rear rib that is adjacent to a fixing part of the vehicle component on the vehicle rear side and provided in a protruding manner to the vehicle upper side.

6. The vehicle front structure according to claim 5, further comprising:

a battery disposed adjacently to the opposed portion of the cover top plate portion on the vehicle-width-direction outer side, wherein the cover top plate portion is configured such that a lower end of the inclined surface in the opposed portion is positioned on the vehicle lower side of an upper end of the battery.

7. The vehicle front structure according to claim 2, wherein the opposed portion of the cover top plate portion includes a front rib that is adjacent to the grille front face portion on the vehicle rear side, is provided in a protruding manner to the vehicle upper side, and extends in the vehicle width direction.

8. The vehicle front structure according to claim 2, comprising a vehicle component that is disposed on the vehicle lower side of the outside air introduction hole and fixed to the opposed portion of the cover top plate portion, wherein the opposed portion of the cover top plate portion includes a rear rib that is adjacent to a fixing part of the vehicle component on the vehicle rear side and provided in a protruding manner to the vehicle upper side.

9. The vehicle front structure according to claim 2, further comprising:

a battery disposed adjacently to the opposed portion of the cover top plate portion on the vehicle-width-direction outer side, wherein the cover top plate portion is configured such that a lower end of the inclined surface in the opposed portion is positioned on the vehicle lower side of an upper end of the battery.

10. The vehicle front structure according to claim 3, comprising a vehicle component that is disposed on the vehicle lower side of the outside air introduction hole and fixed to the opposed portion of the cover top plate portion, wherein the opposed portion of the cover top plate portion includes a rear rib that is adjacent to a fixing part of the vehicle component on the vehicle rear side and provided in a protruding manner to the vehicle upper side.

11. The vehicle front structure according to claim 3, further comprising:

a battery disposed adjacently to the opposed portion of the cover top plate portion on the vehicle-width-direction outer side, wherein the cover top plate portion is configured such that a lower end of the inclined surface in the opposed portion is positioned on the vehicle lower side of an upper end of the battery.

12. The vehicle front structure according to claim 4, further comprising:

a battery disposed adjacently to the opposed portion of the cover top plate portion on the vehicle-width-direction outer side, wherein the cover top plate portion is configured such that a lower end of the inclined surface in the opposed portion is positioned on the vehicle lower side of an upper end of the battery.

13. The vehicle front structure according to claim 7, comprising a vehicle component that is disposed on the vehicle lower side of the outside air introduction hole and fixed to the opposed portion of the cover top plate portion, wherein the opposed portion of the cover top plate portion includes a rear rib that is adjacent to a fixing part of the vehicle component on the vehicle rear side and provided in a protruding manner to the vehicle upper side.

14. The vehicle front structure according to claim 7, further comprising:

a battery disposed adjacently to the opposed portion of the cover top plate portion on the vehicle-width-direction outer side, wherein the cover top plate portion is configured such that a lower end of the inclined surface in the opposed portion is positioned on the vehicle lower side of an upper end of the battery.

15. The vehicle front structure according to claim 8, further comprising:

a battery disposed adjacently to the opposed portion of the cover top plate portion on the vehicle-width-direction outer side, wherein the cover top plate portion is configured such that a lower end of the inclined surface in the opposed portion is positioned on the vehicle lower side of an upper end of the battery.

16. The vehicle front structure according to claim 10, further comprising:
a battery disposed adjacently to the opposed portion of the cover top plate portion on the vehicle-width-direction outer side, wherein
the cover top plate portion is configured such that a lower end of the inclined surface in the opposed portion is positioned on the vehicle lower side of an upper end of the battery.

17. The vehicle front structure according to claim 13, further comprising:
a battery disposed adjacently to the opposed portion of the cover top plate portion on the vehicle-width-direction outer side, wherein
the cover top plate portion is configured such that a lower end of the inclined surface in the opposed portion is positioned on the vehicle lower side of an upper end of the battery.

\* \* \* \* \*